United States Patent
Mulderry et al.

(10) Patent No.: US 7,343,322 B1
(45) Date of Patent: Mar. 11, 2008

(54) METHOD AND APPARATUS FOR MARKETING PRODUCTS OVER THE INTERNET

(75) Inventors: Amy Mulderry, New York, NY (US); William J. Stutzman, Branford, CT (US); Holley Vantrease, New York, NY (US)

(73) Assignee: Time Consumer Marketing, Inc., New York, NY (US)

( * ) Notice: Subject to any disclaimer, the term of this patent is extended or adjusted under 35 U.S.C. 154(b) by 735 days.

(21) Appl. No.: 09/473,649

(22) Filed: Dec. 28, 1999

(51) Int. Cl.
*G06Q 30/00* (2006.01)
(52) U.S. Cl. .................................................. 705/26
(58) Field of Classification Search ............... 705/26, 705/27, 37
See application file for complete search history.

(56) References Cited

U.S. PATENT DOCUMENTS

| | | | |
|---|---|---|---|
| 4,484,217 A | | 11/1984 | Block et al. |
| 5,543,607 A | * | 8/1996 | Watanabe et al. ........... 235/383 |
| 5,671,276 A | | 9/1997 | Eyer et al. |
| 5,694,594 A | | 12/1997 | Chang |
| 5,710,887 A | | 1/1998 | Chelliah et al. |
| 5,740,549 A | | 4/1998 | Reilly et al. |
| 5,757,917 A | | 5/1998 | Rose et al. |
| 5,825,881 A | | 10/1998 | Colvin, Sr. |
| 5,826,241 A | | 10/1998 | Stein et al. |
| 5,848,396 A | * | 12/1998 | Gerace .......................... 705/10 |
| 5,895,454 A | | 4/1999 | Harrington |
| 5,909,492 A | | 6/1999 | Payne et al. |
| 5,913,040 A | | 6/1999 | Rakavy et al. |
| 5,926,796 A | | 7/1999 | Walker et al. |
| 5,960,411 A | | 9/1999 | Hartman et al. |
| 6,005,939 A | * | 12/1999 | Fortenberry et al. .......... 705/76 |
| 6,101,477 A | * | 8/2000 | Hohle et al. .................... 705/1 |

FOREIGN PATENT DOCUMENTS

| | | | | |
|---|---|---|---|---|
| FR | 2757656 | * | 6/1998 | .................. 705/26 |
| JP | 09-259189 | * | 10/1997 | .................. 705/26 |
| JP | 10-069580 | * | 3/1998 | .................. 705/26 |

* cited by examiner

*Primary Examiner*—Gerald J O'Connor
(74) *Attorney, Agent, or Firm*—Finnegan, Henderson, Farabow, Garrett & Dunner, LLP

(57) ABSTRACT

A method and apparatus is disclosed for permitting an online user to buy merchandise over the Internet from multiple vendor sites, after a single entry of their credit card information. In a preferred embodiment, the present invention includes an online impulse marketing system including a plurality of customer and merchant servers/computers. A customer computer is programmed to provide a user with access to a computer network for the purpose of contacting a plurality of online merchant sites for the purpose of purchasing merchandise. The merchant computer is programmed to: store product information and order processing software in the form of hypertext transfer protocol (HTTP) pages for use by requesting customer computers; process requests for merchandise; request an impulse sale offer from a second merchant; display the offer; process the customer's response; and then automatically transmit the customer's credit card information to the second merchant, if necessary.

7 Claims, 11 Drawing Sheets

Free and Instant Gratification

FreeShop — Click here!

bigstar.com TO HOME PAGE quick search
[Title ▼]
[         ]
[Go!]

shopping basket
1 item in Basket

BigStar Home Page big selection
Power Search
Popular Categories
Top Selling Videos
New Releases
Video Alert
Kids Video features
Current Features
Today's Movie News
This Week's Box Office
Chat Calendar
Star Interviews
AFI Selections
Big Hits
Contests
Birthday Finder dvds
DVD Home Page
Top Selling DVDs
DVD Reviews
DVD Extras gift ideas
Gift Center
Videos Under $10 customer service
Customer Service
  Home Page
Order History
  (Secure Server Only)
Sign Out
Update Profile affiliate program
Join the Program
Affiliate Homepage
Affiliate Login

YOUR SHOPPING CART

Problems with your shopping cart? Please give us a specific description of your "Check Out" problem. Click here to notify us. NOTE: We only ship within the United States at this time.

Click here to continue shopping

| Buy | Qty. | Movie Title | Item Price | Sale Price | Subtotal |
|---|---|---|---|---|---|
| ✓ | [1] | Babe (VHS) | $14.98 | $12.73 | $12.73 |
|   |   | Total (before shipping and tax): |   |   | $ 12.73 |

610

FREE Movie Offer
Please continue shopping! You are not yet eligible for this offer. Either the total in your cart is less than $15, or you have only selected one of the six free movies.
See offer details
—620

If you have made any changes to quantities click on the RECALCULATE button.
[Recalculate]

Ready to BUY? click on CHECKOUT
[Secure Server ▼] [Checkout]  —630

To REMOVE an item from your basket, type "0" in the Qty.box and hit the RECALCULATE button.

Click here to continue shopping —640

FIG. 6 bigstar.com
TO HOME PAGE order progress: begin checkout — billing information — shipping information — review order — checkout complete

*quick search*

[Title ▼]
[ ]
[Go!]

shopping basket
1 item in Basket

BigStar Home Page big selection
Power Search
Popular Categories
Top Selling Videos
New Releases
Video Alert
Kids Video features
Current Features
Today's Movie News
This Week's Box Office
Chat Calendar
Star Interviews
AFI Selections
Big Hits
Contests
Birthday Finder dvds
DVD Home Page
Top Selling DVDs
DVD Reviews
DVD Extras gift ideas
Gift Center
Videos Under $10 customer service
Customer Service
   Home Page
Order History
   (Secure Server Only)
Sign Out
Update Profile affiliate program
Join the Program
Affiliate Homepage
Affiliate Login about bigstar
Press

BEGIN CHECKOUT

NOTE: We do not ship internationally.
Please check your order below. If you would like to change your order, please click on "modify order" below. Shipping charges and sales tax (CA, IL and NY only) will be added later.

If you have registered and signed in, or ordered with us before, you may have billing and shipping information stored in the pull-down menus below.

STEP 1:   Choose from the pull-down list of stored billing information or create a new one.

STEP 2:   Choose from the pull-down list of stored shipping addresses or create a new one STEP 3:   Choose a shipping method below and the cost will be added to your order in the next step with sales tax (CA, IL and NY only).
More on shipping charges Note: To make changes to your shipping info list, visit your Address Book.

| Billing Information: 420 |
|---|
| Create a new billing record: ▼ |

| Shipping Address: 410 |
|---|
| Create a new shipping address: ▼ |

| Qty. | Movie Title | Item Price | Sale Price | Subtotal |
|---|---|---|---|---|
| 1 | Babe (VHS) | $14.98 | $12.73 | $12.73 |
| | | Total (before shipping and tax): | | $12.73 |

Choose your shipping method:
⦿ USPS First Class ( $3.94 )
◯ USPS Priority ( $4.94 )
◯ UPS Next Day ( $10.94 )

[Money Order]   [Continue Checkout] ⟵ 730

Problems with this page? Click here to notify us. Please give us a specific description of your "Check Out" problem.

Note: Choosing UPS Next Day or 2nd Day does not mean that you will receive your order 1 or 2 days after you submit your order. It may take 2 to 3 days to assemble and ship your order. UPS shipping only reduces the travel time after the order leaves or warehouse.

Orders containing more than one item may be shipped from different warehouses. Therefore, items may arrive in separate packages (with a separate packing slip) and may also arrive on different days.

FIG. 7 customer service

- Customer Service Home Page
- FAQ
- Sign Out
- Order Receipts (Secure Server Only)

- Update Profile
- Email us
- Terms of Use affiliate program

- Join the Program
- Affiliate Homepage
- Affiliate Login about bigstar

- Press

1010

Entertainment Weekly Magazine FREE Trial Offer ~1015

☐ Check here to try 8 issues FREE of Entertainment Weekly

Enjoy your FREE trial issues! We think you'll love our magazine. But, if you are not 100% satisfied call the 800 number we've provided within 60 days and you will not be charged. If you like our magazine do absolutely nothing. After you 8 FREE trial issues, your credit card will be charged $19.95 for an additional 12 issues, 20 issues in all. You will continue to receive Entertainment Weekly without interruption until you tell us to stop. Then you will be charged semi-annually at the guaranteed low rate at that time. Your satisfaction is always guaranteed and you can call us at any time for a full refund.

Send Order

Please check your order carefully. When you're ready, click on the "Send Order" button below and BigStar will start processing your order. Your movies will soon be on their way!

[ Send Order ] ~1020

[ Cancel Order ] ~1030

FIG. 10 bigstar.com
TO HOME PAGE order progress: begin checkout — billing information — shipping information — review order — checkout complete

*quick search*

Title ▼

Go!

shopping basket
1 item in Basket

BigStar Home Page big selection
Power Search
Popular Categories
Top Selling Videos
New Releases
Video Alert
Kids Video features
Current Features
Today's Movie News
This Week's Box Office
Chat Calendar
Star Interviews
AFI Selections
Big Hits
Contests
Birthday Finder dvds
DVD Home Page
Top Selling DVDs
DVD Reviews
DVD Extras gift ideas
Gift Center
Videos Under $10 customer service
Customer Service
   Home Page
Order History
   (Secure Server Only)
Sign Out
Update Profile affiliate program
Join the Program
Affiliate Homepage
Affiliate Login

THANK YOU!

Your order is complete.

Thank you for your order!

FIG. 11

METHOD AND APPARATUS FOR MARKETING PRODUCTS OVER THE INTERNET

FIELD OF THE INVENTION

The present invention relates generally to a distributed computer information system, and more particularly to a user-interactive system for selling products from different vendor sites, over the Internet.

DESCRIPTION OF THE PRIOR ART

The use of impulse or point of purchase marketing is well established in supermarkets, department stores and other shopping venues that attract a large volume of consumers in search of a vast assortment of goods and services. As they slowly move through a store, shoppers are repeatedly enticed to purchase one product or another, through the use of short-term sales, frequent shopper bargains, rebates, volume discounts, etc. Merchandise that comes within a shopper's sight or grasp is much more likely to be purchased than a product that while desired, is nonetheless unseen. In fact, according to research conducted by the Gallop Organization, in many product categories, more than two-thirds of the purchase decisions made by shoppers are actually made at the point of purchase. Commercial establishments actually place the higher profit items at eye level to further enhance their marketability. As a shopper stands in line waiting to purchase their merchandise, they continue to be enticed to make last minute purchases. The frequency of purchase decisions actually goes up at this point as the shoppers in essence become a "captive audience." That is, they are no longer moving up and down the merchandise aisles searching, and are instead relatively immobile. Nearly three-fourths of purchase decisions are made from this point until the shopper reaches the cash register.

Another example of successful point of purchase marketing is found on television where the Home Shopping Network™, QVC™ and other shopping channels offer viewers merchandise at bargain prices for a limited time.

Most, and perhaps all such examples of impulse or point of purchase marketing are based on systems in which the juxtaposition or placement of merchandise is at a relatively convenient location for the shopper. Furthermore, in virtually all such systems, the consumer is given a small amount of time to make a relatively small purchase and they are required to expend very little effort to consummate the sale.

Up until the present, point of purchase marketing on the Internet or other publicly accessible computer communication networks has been hampered by the structure and content of online vendor sites which are routinely limited to one type of product or service. Consequently, the available product options for impulse sale offers are restricted. Those on-line sites that offer the consumer an option of visiting different vendor sites for the purpose of making an impulse purchase, present the on-line consumer with yet another dilemma . . . whether to expend the additional effort to re-input credit card and contact information, further risking unauthorized use of the data by network hackers, or simply exit the site. The anxiety experienced by on-line shoppers, concerned over the possibility the information will be filched by an unscrupulous interloper often prevents them from repeatedly entering their credit card data over such a short period of time, regardless of how they feel about the offered product.

There are also examples of computer programs that give the user the opportunity to make an instantaneous decision to purchase merchandise. In all such examples known to the inventor, the merchandise is either permanently embedded in the computer programs or it is stored such that it cannot be easily updated.

As previously discussed, accurate online impulse marketing systems are notoriously difficult to model and implement. Techniques widely used in conventional point of purchase marketing schemes (e.g., a large selection of products, limited time to make the purchase decision and ease in actually purchasing the product) require a large and varied assortment of online merchants operating from the same website with compatible transaction processing mechanisms Such cooperation thus far has been extremely limited in large-scale computer networks. As a result, true impulse marketing systems have thus far enjoyed relatively little success in computer network-based purchasing systems.

It is therefore a goal of the present invention to provide a method of providing an impulse purchasing capability to online users that is convenient, secure and practical.

SUMMARY OF THE INVENTION

Systems and methods consistent with this invention provide an apparatus and method for permitting an online user to buy merchandise over the Internet from multiple vendor sites, after a single entry of credit card information. In a preferred embodiment, the present invention includes an online impulse marketing system including a plurality of customer and merchant computers. A customer computer is programmed to provide a user with access to a computer network for the purpose of contacting a plurality of online merchant sites and purchasing merchandise from the online merchant. The merchant computer is programmed to: (1) store product information and order processing software in the form of hypertext transfer protocol (HTTP) pages for use by requesting customer computers; (2) process requests for merchandise; (3) request an impulse sale offer from a second merchant; (4) display the offer; (5) process the customer's response; and (5) automatically transmit the customer's credit card information to the second merchant, if necessary.

The invention provides a simple design architecture that allows the merchant computer to receive an order for merchandise from a customer computer and consummate the sale by accepting and processing the customer's credit card information. After the sale has been completed, but before the customer computer is logged off the first merchant computer, an offer for presentation to the customer computer is received from a second merchant computer. In the event the user accepts the second offer, the first merchant computer automatically transmits the previously-provided credit card information to the second merchant computer for processing. Once the information is received and processed by the second merchant computer, confirmation is transmitted to the first customer computer via the first merchant computer, and the customer computer is logged off the first merchant computer. In the event the user rejects the second offer, the customer computer is logged off the merchant computer site upon completion of the first transaction.

In an alternate embodiment, the invention transmits a free gift offer from a second merchant through a first merchant computer to a customer computer. The user at the customer computer is informed that acceptance of the free gift (e.g., predetermined number of free issues of a periodical) will lead to a future obligation to pay for continued receipt of the item. Credit card information is transmitted to the second merchant computer for authorization, upon acceptance of the free gift.

Advantageously, this invention creates an attractive avenue for providing seamless communication of credit card information to a plurality of online merchant vendor sites through a single input of the credit card information.

It is to be understood that both the foregoing general description and the following detailed description are exemplary and explanatory only and are not restrictive of the invention, as claimed.

BRIEF DESCRIPTION OF THE DRAWINGS

The accompanying drawings, that are incorporated in and constitute a part of the specification, illustrate presently preferred embodiments of the invention and, together with the general description given above and the detailed description of the preferred embodiments given below, serve to explain the principles of the invention.

FIG. 6 is a pictorial representation of a Web page depicting a virtual shopping cart;

FIG. 7 is a pictorial representation of a Web page depicting the first stage of checking out from a virtual shopping session;

FIG. 10 is a pictorial representation of a Web page depicting a free trial offer in accordance with the present invention; and FIG. 11 is a pictorial representation of a Web page depicting the last stage of a virtual shopping session.

DETAILED DESCRIPTION

Figure 1:
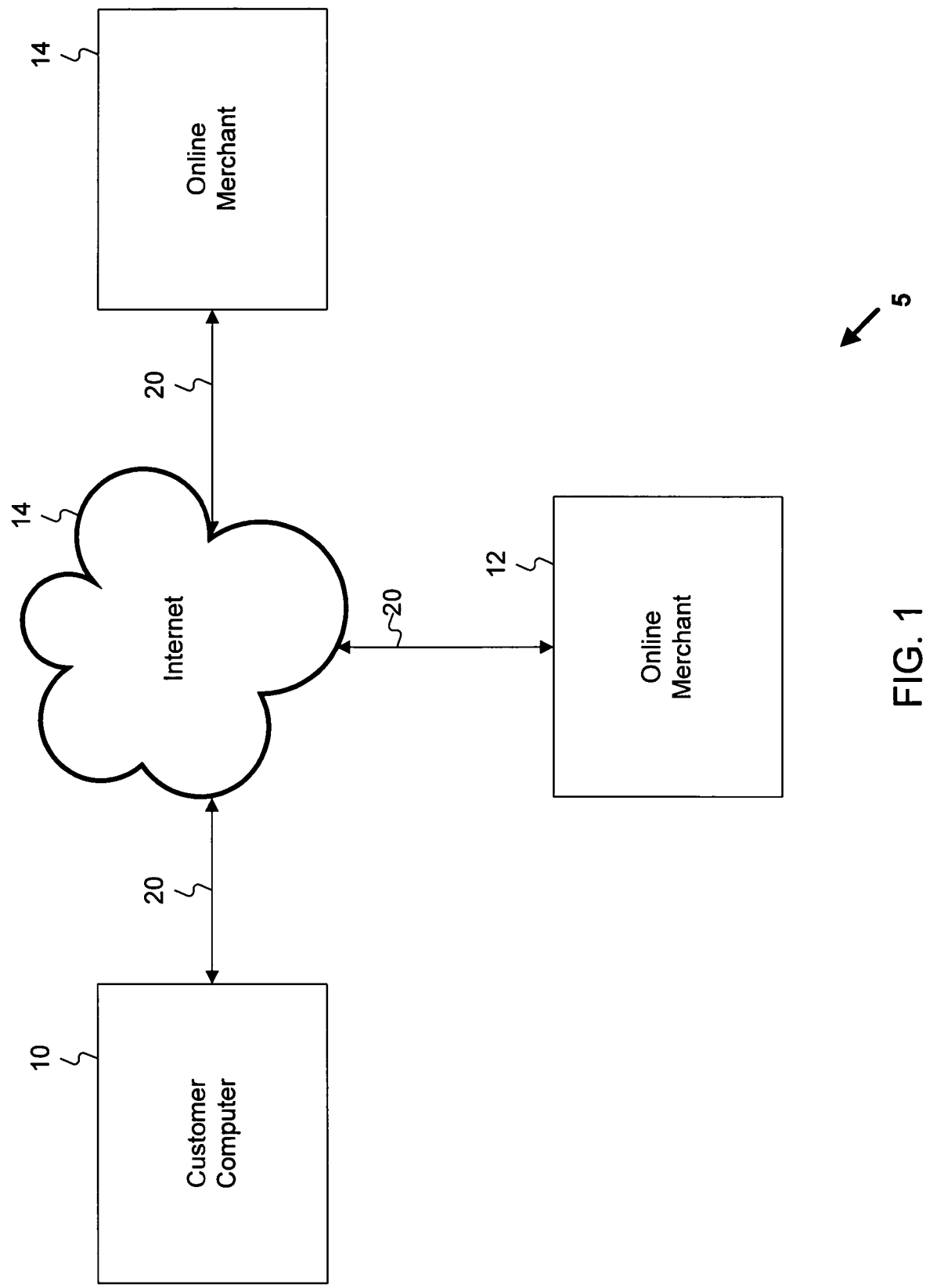
FIG. 1 is a block diagram of a network system architecture in accordance with the present invention.

In the following detailed description of the preferred embodiment, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, not to be taken in a limited sense.

The embodiments of the invention described herein are implemented as logical operations in a computing system. The logical operations of the present invention are implemented: (1) as a sequence of computer implemented steps running on the computing system and (2) as interconnected machine modules within the computing system. The implementation is a matter of choice dependent on the performance requirements of the computing system implementing the invention. Accordingly, the logical operations making up the embodiments of the invention described herein are referred to variously as operations, steps, or modules.

The operating environment in which the present invention is used encompasses general distributed computing systems wherein general purpose computers, work stations, or personal computers are connected via communication links of various types. In a client server arrangement, programs and data, many in the form of objects, are made available by various members of the system.

In accordance with the invention, users at remote terminals in a network communicate through the network to a server or a web site and are able to download data from the server or web site to the user's client work station. As this embodiment of the invention is described herein, a web browser program on a client station for browsing a network, such as the Internet, will be referred to as the browser, while the server work station with which the browser station is communicating during a download will be referred to as the server.

A system in accordance with the present invention, comprises a plurality of merchant and customer computers. Each type of computer may be generally similar to every other type of computer including a central processing unit, display device, and operator input device. Moreover, it will be appreciated that each type of computer may also perform operations described herein as being performed by every other type of computer. The distributed system may comprise any one of a number of types of networks over which client computers and server computers communicate, including local area networks (LANs), wide area networks (WANs), the Internet and any other networks that distribute processing and share data among a plurality of nodes. The on-line services typically provide functionality such as electronic mail (email), file transfer protocol (FTP), and World Wide Web (WWW) access.

WWW is a graphical subnetwork of the Internet. With common "web browser" software of the type of Mosaic or Netscape Navigator, the users may easily access Internet information and services on WWW. The web browser handles the function of locating and targeting information on the Internet and displaying information provided by a web server. WWW utilizes the technology called "hypertext" to organize, search and present information on the Internet. Using the browser, a user can select a word ("hypertext word") from a viewed document, and be linked to another document featuring information related to the word. These links are within the Web server domain and result in a progressively deeper search or base of choices.

In the business arena, a service provider can, with an Internet address and a hypertext editor, develop a hypertext document called a "home page," which a user may explore when he/she visits the provider's Web server. The home page furnishes information about the service offered by the provider through use of graphic images, sound, hyperlink choices, etc. With that information, the user is guided through the online Web site to select desired services and products.

Referring now to the drawings, in which like numerals represent like elements throughout the several figures, the present invention will be described.

Referring first to FIG. 1, a networked data handling system 5 of the present invention is comprised of a plurality of interconnected computers and microprocessors hosting a plurality of operating systems. By way of example, the network can be comprised of pentium™ based microprocessors operating on Windows/NT, UNIX and/or Windows/CE operating systems. The present invention may also be embodied on a variety of different platforms, including Macintosh, UNIX, NextStep, MS-DOS, and the like. For the sake of clarity, FIG. 1 shows two merchant computers and a single customer computer. It is understood that the present invention permits any number of merchant or customer computer systems, each of which operates as described below.

Network 5 includes customer computer 10, a first online merchant computer 12, and a second online merchant computer 14. The online merchant computers (12 and 14) and customer computer 10 are coupled to the Internet 14 via a communications link 20. Online merchant computers (12 and 14) are preferably operated by retail establishments (Macy's, K-mart, Border's, etc.) Their main role is to collect merchandise orders from customer computers 12, process credit card transactions, and serve as an intermediary for other merchant computers wishing to offer goods and services to customer computer 12.

Figure 2:
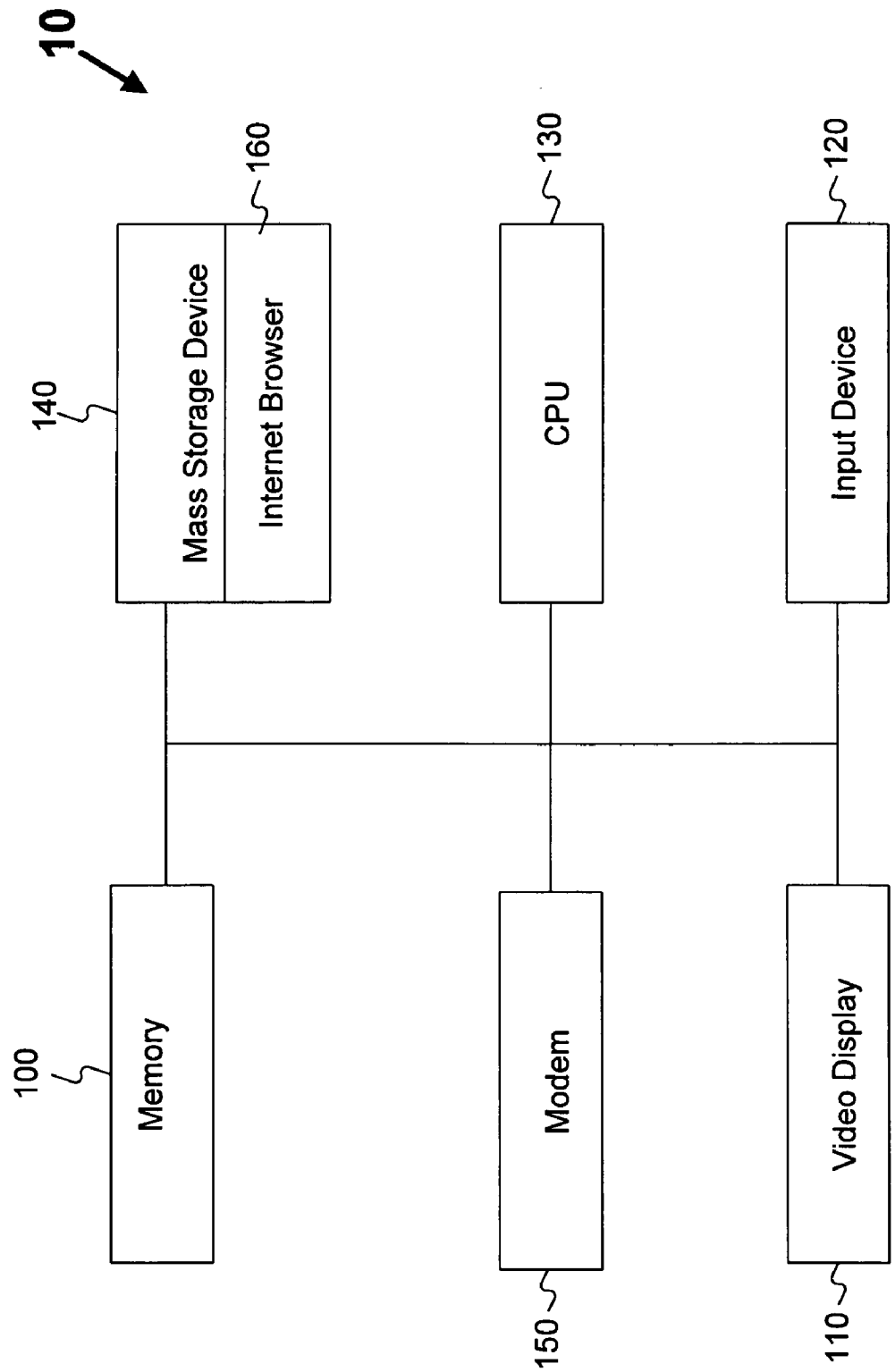
FIG. 2 is a more detailed block diagram of the customer computer of FIG. 1.

As shown in FIG. 2, customer computer 10 preferably includes a main memory 100, a display device 110, input device 120 such as a keyboard and a pointing device (e.g., mouse, track ball, pen, slide pointer or similar device), a mass storage device 140, and a central processing unit (CPU) 130 for performing various functions related to retrieving and viewing Web pages stored on the Internet. These components communicate through a system bus or similar architecture. Additionally, customer computer 10 is preferably connected to an internal or external modem 150 or like device for communication with network 5. Alternatively, customer computer 10 may be connected via an ISDN adapter and an ISDN line for communications with network 5. FIG. 2 also shows an Internet browser 160 stored on mass storage device 140 for directing CPU 130 to perform various functions related to retrieving and viewing Web pages stored on the Internet.

Figure 3:
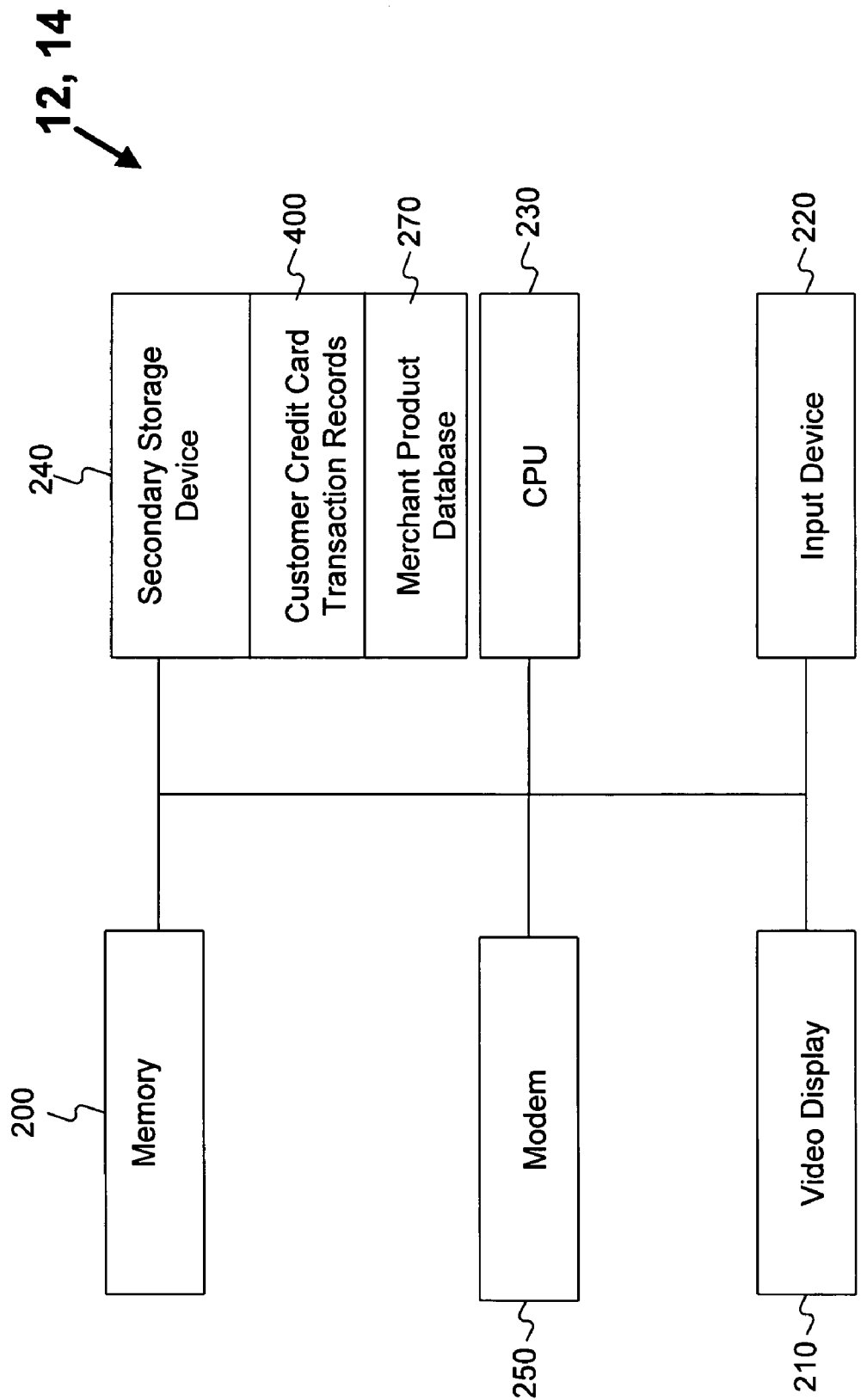
FIG. 3 is a more detailed block diagram of the merchant computer of FIG. 1.

FIG. 3 is a diagrammatic representation of an online merchant computer (12 and 14) in accordance with the present invention. As shown in FIG. 3, online merchant computer (12 and 14) is comprised of a main memory 200, a display device 210, input device 220, a mass storage device 240, a CPU 230 and an internal or external modem 250. As further shown in FIG. 3, mass storage device 240 maintains customer credit card transaction records 400 and a merchant's product database 270. A customer credit card transaction record 400 (shown in FIG. 4) is created every time a customer purchases merchandise with a credit card. Once all the necessary information is collected, it is verified and a credit card transaction record 400 is stored on mass storage device 240 for record-keeping purposes. The merchant product database 270 is comprised of information on various merchant products available online through a series of interconnected Web pages. Once a user accesses a merchant's home page, he/she will be able to access all of the merchant's product pages associated with the home page. Individual pages are generally sent in the form of Hyper-Text Markup Language (HTML) pages across communication link 20 to a Web browser 160 operating on a requesting customer computer 10.

Figure 4:
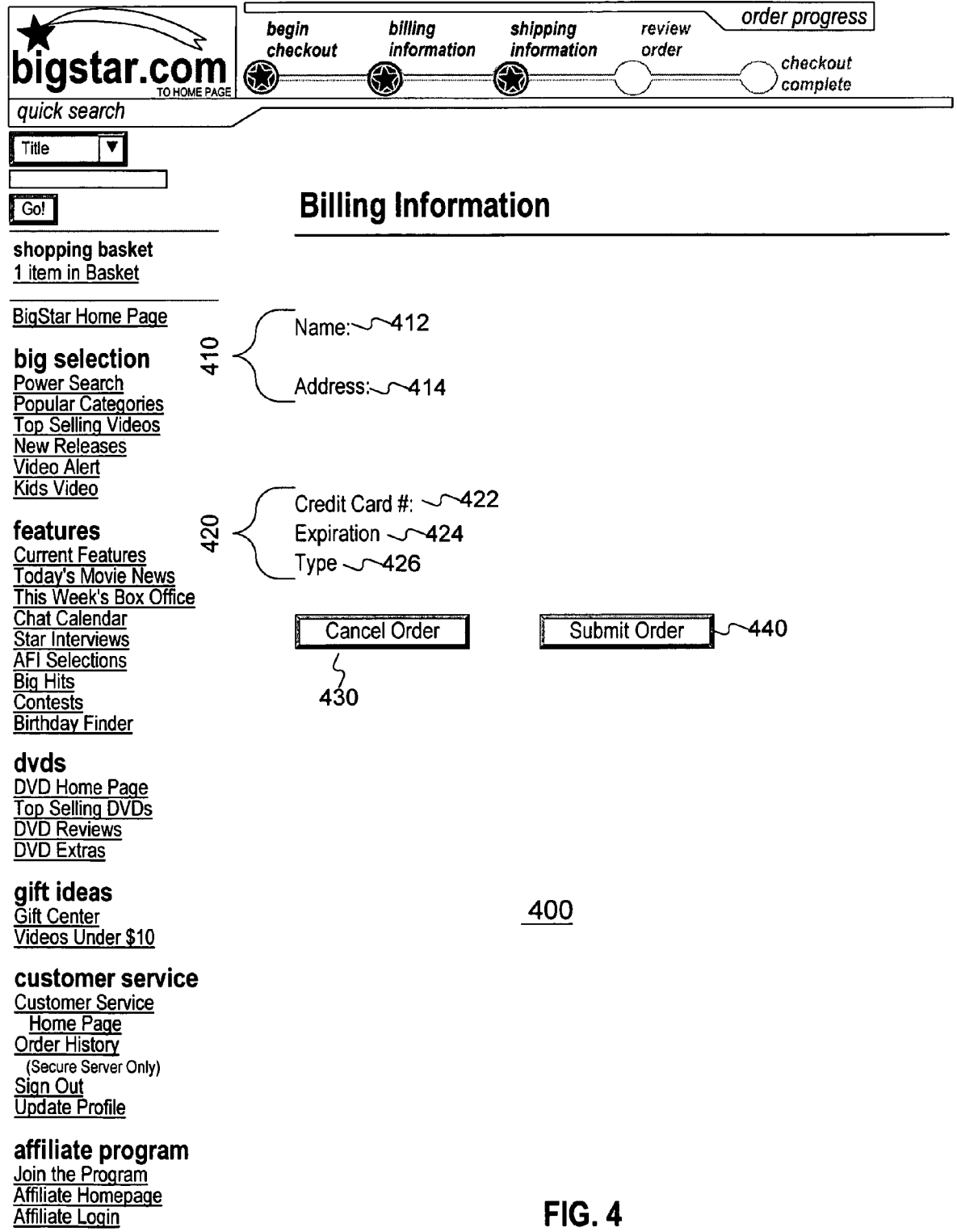
FIG. 4 is a pictorial representation of a Web page depicting Billing and Shipping Information.

As shown in FIG. 4, electronic credit card transaction records 400 consist of information identifying the customer 410, and the credit transaction 420. The customer information 410 is comprised of data on the credit card customer including the customer's name 412 and address 414. Credit transaction information 420 is comprised of information necessary to consummate a transaction. It consists of the credit card number 422, the expiration date 424 and the credit card type 426. Credit card type 426 consists of data identifying a credit card processing institution (e.g., Visa, Mastercard, American Express, Discover, etc.). The "Cancel Order" button 430 and the "Submit Order" button 440 will be explained below.

Figure 5:
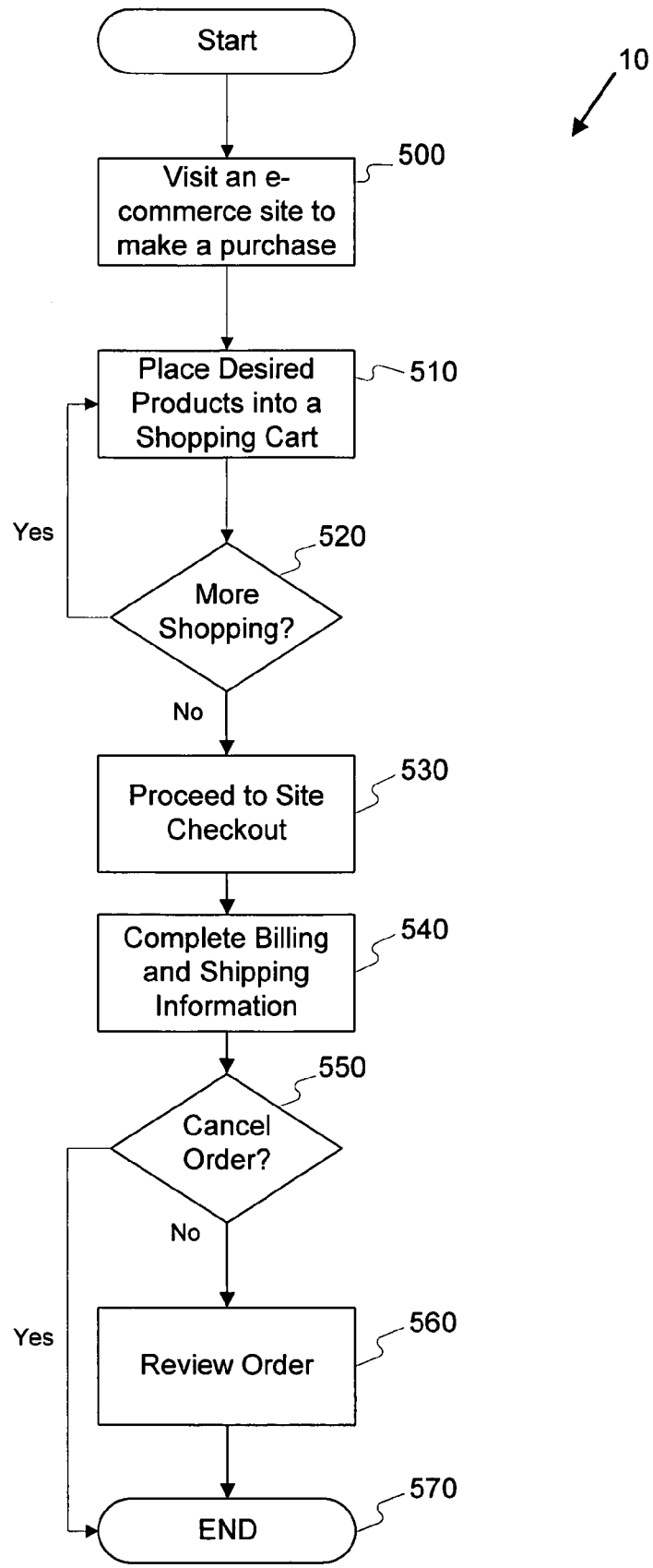
FIG. 5 is a flow chart of the online ordering system of the present invention.

The merchant computers (12 and 14), and customer computer 10 shown in FIG. 1 independently run interrelated software programs and function as a group to process customer requests for merchandise in accordance with the present invention. As shown in FIG. 5, customer computer 10 in step 500 first "visits" an e-commerce site for the purpose of making a purchase. The e-commerce site is hosted on a merchant computer (12 and 14) and is used to advertise merchandise offered by the merchant for purchase. To visit a site, a user logged onto customer computer 10 need only load a merchant's home page onto customer computer 10. Once customer computer 10 has gained access to a merchant's home page operating on merchant computer 12, the user may then place products he/she wishes to buy into a virtual shopping cart (step 510). Placing an item into the virtual shopping cart is not a commitment to purchase the item. However, it does indicate that the shopper is preparing to purchase the item. Modeling the common shopping cart in the online shopping environment simply requires the user be given numerous opportunities to cancel the sale and in effect, return the item to the shelves. As an example, FIG. 6 is a pictorial representation of a typical e-commerce virtual shopping cart.

As shown in FIG. 6, the user has accessed the "bigstar.com" Web page and he/she has selected the movie "Babe" for purchase 610. At this point, the user may also be informed of a promotional offer 620 that further encourages the user to purchase more of the merchant's products. After selecting an item for purchase, the user determines whether he/she would like to further shop at that particular merchant's Web site (step 520). If the user has more shopping, he/she selects the "click here to continue shopping" button 640 (FIG. 6) and the process flows to step 510. If the user does not have any more shopping, he/she selects the "Checkout" button 630 (FIG. 6) and the process flows to step 530. In step 530, the system begins to process the user's selection(s) by first loading the "Begin Checkout" Web page (FIG. 7) onto customer computer 10. Once the "Begin Checkout" page is loaded, process flows to step 540 where the user inputs his/her billing information 710 and shipping address 720.

As shown in FIG. 4, once billing information 420 and shipping address 410 are inputted, the user is given an opportunity to cancel the order by selecting "Cancel Order" button 430. If the user selects the "Cancel Order" button 430 (step 550), process flows to step 570 and terminates. If the user selects "Submit Order" button 440, process flows to step 560 and the user is presented with the screen shown in FIG. 8. It is at this time that the user is provided with an opportunity to review his/her order before finally making the purchase.

Figure 8:
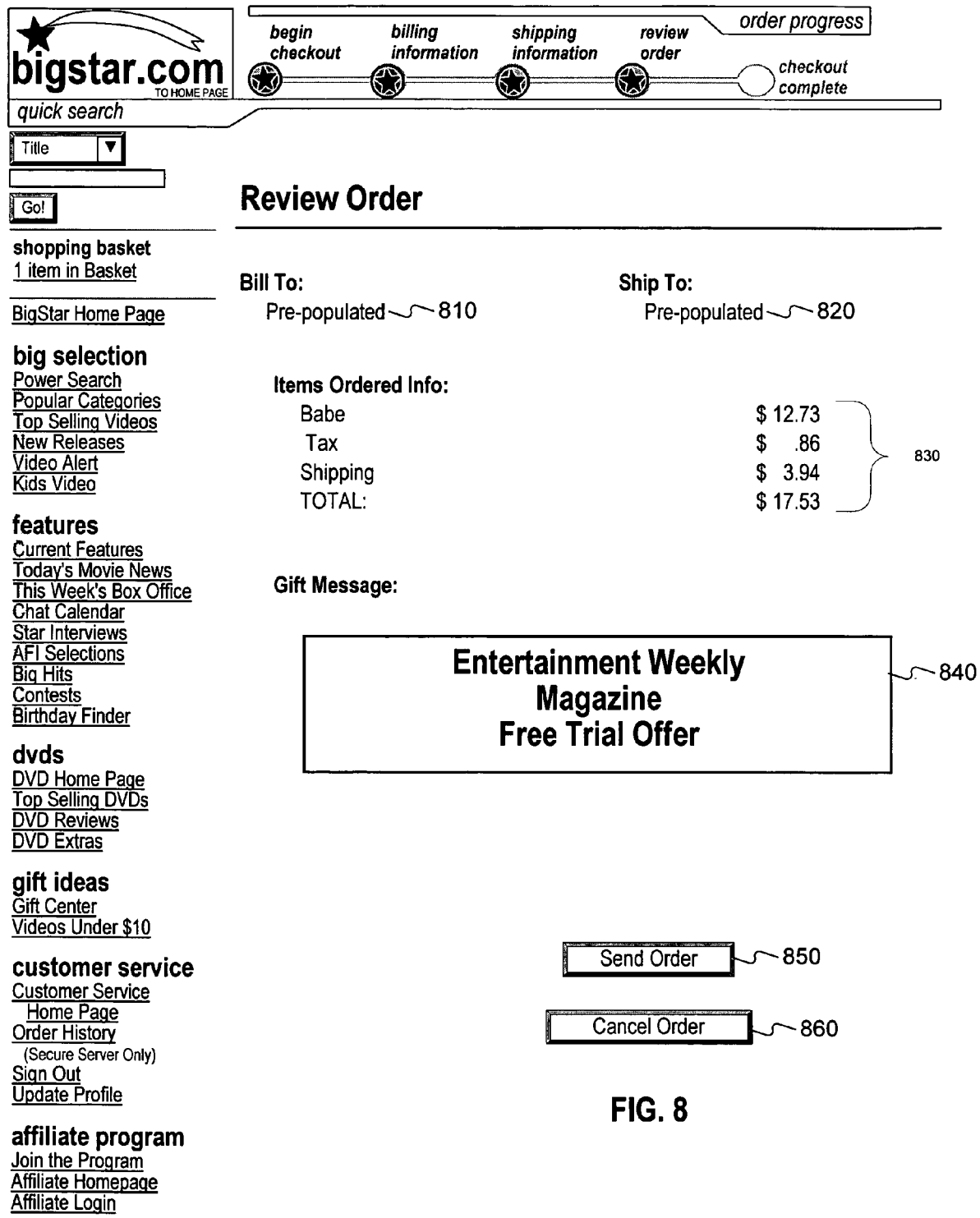
FIG. 8 is a pictorial representation of a Web page depicting the "Review Order" stage of a virtual shopping session.

As shown in FIG. 8, the user's billing information 420, shipping information 820 and merchandise information 830 is pre-populated. That is, the information is automatically transferred to this page without any user intervention. More specifically, billing information 420 (FIG. 4) is assumed to match shipping information 820 (FIG. 8) unless the customer indicates otherwise. The "Review Order" page of FIG. 8 also contains a "Send Order" button 850 and a "Cancel Order" button 860.

Figure 9:
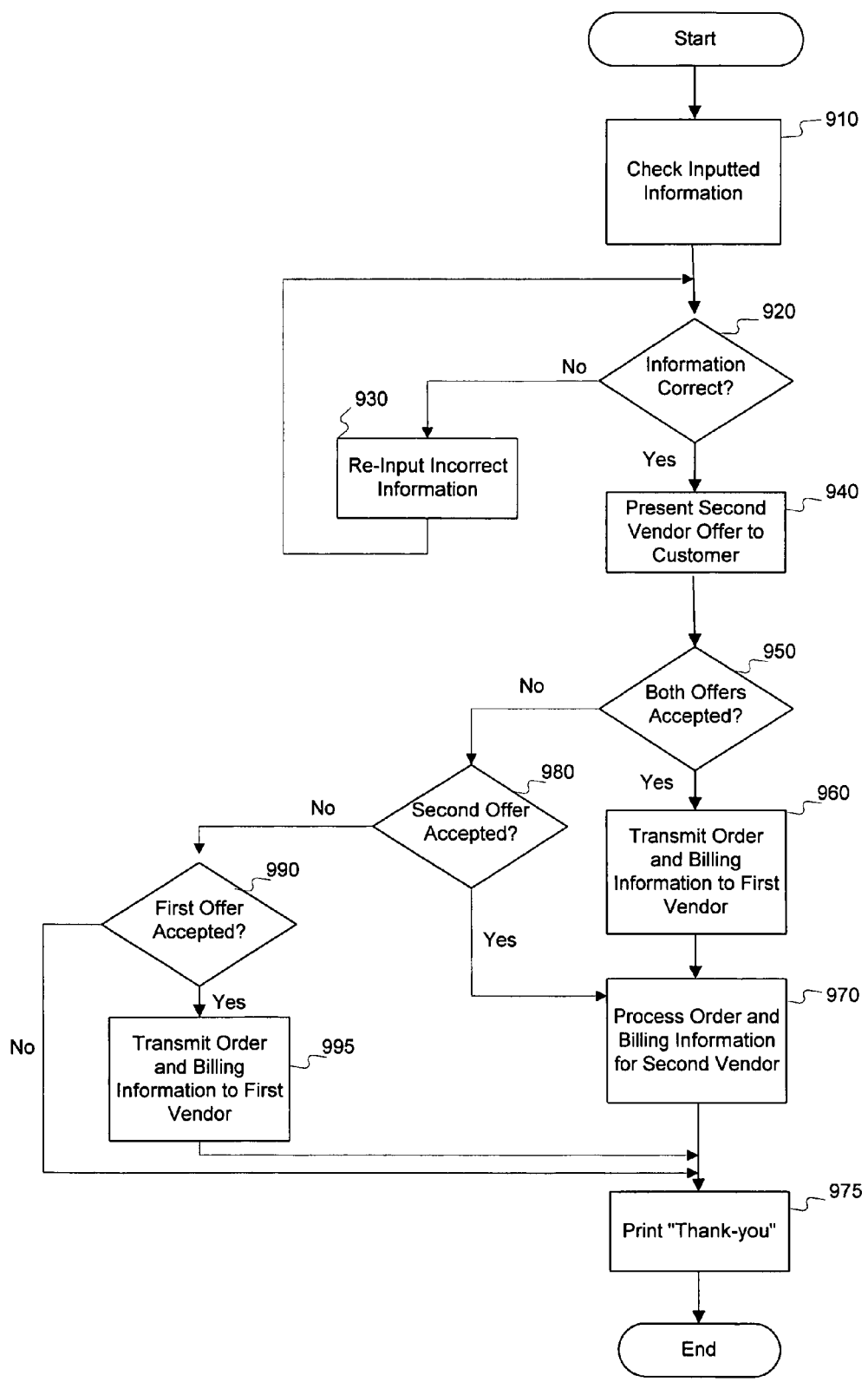
FIG. 9 is a flow chart of the "Review Order" process in accordance with the present invention.

FIG. 9 shows a flowchart depicting the software process performed when a user reaches the "Review Order" stage of the merchandise ordering process (step 560). As shown in FIG. 9, the user first checks the inputted information for correctness (step 910). If, in step 920, the user determines the information is not correct, process flows to step 930, and the user is given an opportunity to re-input the correct information. If, on the other hand, the information is correct, process flows to step 940 and the user is presented with an offer from a second merchant. In a preferred embodiment, the second merchant information is displayed in a region indicated by the label 840 in FIG. 8. The offer is conveyed to the user in the form of a cryptic message indicating the general nature of the second merchant's offer. However, to view the entire offer as shown in FIG. 10, the user must first manipulate the input device 120 (FIG. 2) into the region indicated by 840, and then select the offer. Processing then flows to step 950.

At this point, the user has several options, he/she can either accept both offers, reject both offers, accept the first offer and reject the second, or reject the first offer and accept the second offer. FIG. 10 shows a representative message that may be communicated to a user as part of the second merchant offer 1015. As shown in FIG. 10, a user is given a description of the offered product and is provided with an opportunity to accept the offer, as indicated by the box labeled 1010. If the user would like to receive the previously selected merchandise in addition to the second merchant's offer (i.e., the user answers "yes" in step 950), he/she selects buttons 1010 and 1020. Process then flows to step 960 where order and billing information is transmitted to the first merchant. Next, the process flows to step 970 where order and billing information is transmitted to the second merchant.

If the user decides to accept the first merchant's offer (the previously selected merchandise) and reject the second merchant's offer (i.e., he/she answers "no" in step 950, "no" in step 980, and "yes" in step 990), the user would either: (1) select the "Send Order" button 850 (FIG. 8), without viewing the second merchant's offer; or (2) after viewing the second merchant's offer, select button 1020 (FIG. 10) without also selecting button 1010. Either action communicates the user's desire to accept the first offer and reject the second merchant's offer. Processing would flow to step 995 where order and billing information would be transmitted to the first vendor for processing.

In the event the user decides that he/she only wants the second merchant's offer (i.e., the user answers "no" in step 950 and "yes" in step 980), the user would simply select buttons 11010 and 1030. The processing would then flow to step 970 where the order and billing 110 information is transmitted to the second merchant.

If the user decides to cancel both orders (i.e., he/she answers "no" in step 950, "no" in step 980, and "no" in step 990), the user would either: (1) select "Cancel Order" button 860 (FIG. 8); or (2) select "Cancel Order" button 1030 (FIG. 10) without also selecting button 1010. In this case, processing would flow to step 995 where the order and billing information is transmitted to the first vendor for processing.

Upon completion of the transaction, regardless of the user's selection, a "thank-you" message (FIG. 11) is communicated to the user (step 975) and the process terminates. Termination of the "Review Order" process in FIG. 9, results in the process flowing from step 560 (in FIG. 5) to step 570 where the entire process terminates.

While the specification describes the process as involving two merchant computers and one customer computer, it is understood that the process may actually involve any number of merchant computers interacting with the customer computer.

From the foregoing description, it will be appreciated that the present invention provides an efficient system and method for combining credit card transaction data with merchant advertising information and presenting the combined information to a credit card customer over the Internet. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Although aspects of the present invention are described as being stored in memory, one skilled in the art will appreciate that these aspects can also be stored on or read from other types of computer-readable media, such as secondary storage devices, like hard disks, floppy disks, or CD-ROMs; a carrier wave from the Internet; or other forms of RAM or ROM. Similarly, the method of the present invention may conveniently be implemented in program modules based upon the flow charts in FIGS. 5 and 9. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

We claim:

1. A method of completing a plurality of transactions on a computer network involving at least one customer computer directly operated by a customer and a plurality of merchant computers, said method comprising the following steps:

transmitting an offer from a first merchant computer to a customer computer;

transmitting information inputted by the customer from the customer computer to the first merchant computer in response to the offer;

utilizing the information inputted by the customer to process the offer, wherein said information inputted by the customer contains a payment method and customer identification data required by said first merchant computer to process said offer;

transmitting a second offer from a second merchant computer to said customer computer;

transmitting said information inputted by the customer from said first merchant computer to said second merchant computer, provided said customer computer accepts said second offer processing said information inputted by the customer by said second merchant computer;

causing a merchandise to be delivered to the customer associated with said information inputted by the customer; and automatically debiting a customer account for a purchase corresponding to said information inputted by the customer after said merchandise has been delivered, provided said customer does not cancel future delivery of said merchandise.

2. The method of claim 1 wherein said step of transmitting an offer is further comprised of the following steps:
sending an offer from said second merchant computer to said first merchant computer; and
presenting said offer by said first merchant computer to said customer computer.

3. The method of claim 1 wherein said step of transmitting an offer is further comprised of the following steps:
sending an offer from said second merchant computer to said first merchant computer;
storing said offer on said first merchant computer; and
presenting said offer by said first merchant computer to said customer computer.

4. The method of claim 1, wherein said merchandise is a predetermined number of issues of a periodical.

5. A method of completing a plurality of transactions on a computer network involving at least one customer computer directly operated by a customer and a plurality of merchant computers, said method comprising the following steps:
transmitting an offer from a first merchant computer to a customer computer;
transmitting information inputted by the customer from the customer computer to the first merchant computer in response to the offer;
utilizing the information inputted by the customer to process the offer, wherein said information inputted by the customer contains a payment method and customer identification data required by said first merchant computer to process said offer;
transmitting a second offer from at least a second merchant computer to said customer computer;
transmitting said information inputted by the customer from said first merchant computer to said at least second merchant computer, provided said customer computer accepts said second offer;
processing said information inputted by the customer by at least said second merchant computer;
causing a merchandise to be delivered to the customer associated with said information inputted by the customer; and
automatically debiting a customer account for a purchase corresponding to said information inputted by the customer after said merchandise has been delivered, provided said customer does not cancel future delivery of said merchandise.

6. The method from claim 5 wherein said step of transmitting an offer is further comprised of the following steps:
sending an offer from said at least second merchant computer to said first merchant computer; and
presenting said offer by said first merchant computer to said customer computer.

7. The method from claim 5 wherein said step of transmitting an offer is further comprised of the following steps:
sending an offer from said at least second merchant computer to said first merchant computer;
storing said offer on said first merchant computer; and
presenting said offer by said first merchant computer to said customer computer.

* * * * *

UNITED STATES PATENT AND TRADEMARK OFFICE
CERTIFICATE OF CORRECTION

PATENT NO. : 7,343,322 B1 Page 1 of 1
APPLICATION NO. : 09/473649
DATED : March 11, 2008
INVENTOR(S) : Amy Mulderry et al.

It is certified that error appears in the above-identified patent and that said Letters Patent is hereby corrected as shown below:

Claim 1, column 8, line 62, "offer" should read --offer;--.

Claim 6, column 10, line 19, "from" should read --of--.

Claim 7, column 10, line 26, "from" should read --of--.

Signed and Sealed this

Fifteenth Day of July, 2008

JON W. DUDAS
*Director of the United States Patent and Trademark Office*